United States Patent
King et al.

(10) Patent No.: US 8,126,912 B2
(45) Date of Patent: Feb. 28, 2012

(54) GUIDED CONTENT METADATA TAGGING FOR AN ONLINE CONTENT REPOSITORY

(75) Inventors: Brian King, Redmond, WA (US); Anoop Gupta, Woodinville, WA (US); Craig Bartholomew, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 436 days.

(21) Appl. No.: 12/147,524

(22) Filed: Jun. 27, 2008

(65) Prior Publication Data
US 2009/0327336 A1  Dec. 31, 2009

(51) Int. Cl.
G06F 17/30 (2006.01)
G06F 17/00 (2006.01)

(52) U.S. Cl. ......... 707/777; 707/797; 707/829; 706/45

(58) Field of Classification Search .......... 707/705–711, 707/727, 735, 748, 751–752, 740, 777–778, 707/797, 829; 715/236, 811, 963, 968; 706/45–50; 709/203–204, 215–220
See application file for complete search history.

(56) References Cited

U.S. PATENT DOCUMENTS

| | | | |
|---|---|---|---|
| 6,094,657 A | 7/2000 | Hailpern et al. | |
| 6,311,194 B1* | 10/2001 | Sheth et al. | 715/236 |
| 6,856,967 B1 | 2/2005 | Woolston et al. | |
| 6,980,984 B1* | 12/2005 | Huffman et al. | 1/1 |
| 7,146,564 B2 | 12/2006 | Kim et al. | |
| 7,246,134 B1* | 7/2007 | Kitain et al. | 1/1 |
| 7,395,511 B1* | 7/2008 | Robertson et al. | 715/810 |
| 7,774,817 B2* | 8/2010 | Gupta | 725/86 |
| 2002/0078045 A1* | 6/2002 | Dutta | 707/7 |
| 2002/0194434 A1* | 12/2002 | Kurasugi | 711/137 |
| 2004/0024739 A1* | 2/2004 | Copperman et al. | 707/1 |
| 2004/0174434 A1 | 9/2004 | Walker et al. | |
| 2005/0022114 A1 | 1/2005 | Shanahan et al. | |
| 2005/0160363 A1 | 7/2005 | Bhogal et al. | |
| 2005/0246193 A1* | 11/2005 | Roever et al. | 705/1 |
| 2005/0289168 A1* | 12/2005 | Green et al. | 707/101 |
| 2006/0106782 A1* | 5/2006 | Blumenau et al. | 707/3 |
| 2006/0106814 A1* | 5/2006 | Blumenau et al. | 707/10 |
| 2006/0212486 A1* | 9/2006 | Kennis et al. | 707/200 |
| 2007/0016577 A1 | 1/2007 | Lasa et al. | |
| 2007/0022110 A1* | 1/2007 | Suda et al. | 707/5 |

(Continued)

FOREIGN PATENT DOCUMENTS

CA  2514165  *  1/2007

(Continued)

OTHER PUBLICATIONS

Pierpaolo Di Bitonto et al. "A taxonomy for cataloging LOs using IEEE educational metadata",Seventh IEEE International Conference on Advanced Learning Technologies (ICALT 2007), 3 pages.*

(Continued)

Primary Examiner — Srirama Channavajjala

(57) ABSTRACT

A method for tagging content. The method includes receiving an initial metadata tag and associating the initial metadata tag with an object of an online repository. Based on the initial metadata tag, a metadata tag knowledgebase is accessed to derive at least one suggested metadata tag. A confirmation regarding the at least one suggested metadata tag is received and the suggested metadata tag is associated with the object. The object is then uploaded to the repository, and the metadata tag knowledgebase is updated to reflect tags associated with the object.

17 Claims, 5 Drawing Sheets

U.S. PATENT DOCUMENTS

| | | | |
|---|---|---|---|
| 2007/0110044 A1* | 5/2007 | Barnes et al. | 370/360 |
| 2007/0112825 A1 | 5/2007 | Cook et al. | |
| 2007/0150457 A1* | 6/2007 | Goldman et al. | 707/3 |
| 2007/0250487 A1* | 10/2007 | Reuther | 707/3 |
| 2008/0005118 A1 | 1/2008 | Shakib et al. | |
| 2008/0005148 A1* | 1/2008 | Welch et al. | 707/102 |
| 2010/0057694 A1* | 3/2010 | Kunjithapatham et al. | 707/3 |

FOREIGN PATENT DOCUMENTS

| | | | |
|---|---|---|---|
| WO | 0188848 A2 | | 11/2001 |
| WO | WO 2004031765 | * | 4/2004 |
| WO | WO 2007052285 | * | 5/2007 |
| WO | WO 2008/097727 | * | 8/2008 |

OTHER PUBLICATIONS

Sandra G. Dykes et al. "Taxonomy and Design Analysis for DistributedWeb Caching", Proceedings of the 32nd Hawaii International Conference on System Sciences—1999, pp. 1-10.*

Jakob Voβ, "Tagging, Folksonomy & Co—Renaissance of Manual Indexing?", Jan. 2007, pp. 1-12.

"Tagging Manager", http://sourceforge.net/projects/taggingmanager/.

Vojnovic, et al., "Ranking and Suggesting Tags in Collaborative Tagging Applications", Microsoft Research, Technical Report, Feb. 2007, 16 pages.

* cited by examiner

GUIDED CONTENT METADATA TAGGING FOR AN ONLINE CONTENT REPOSITORY

BACKGROUND

The widespread emergence of the Internet has led to a number of popular online content repositories. An online content repository typically functions as a web-based service that allows users to upload and share different types of content. The content can be, for example, digital images, photographs, video files, documents such as blogs etc., and the like. Several companies have emerged that specialize in providing the storage and access services for online content repositories. Such companies include, for example, Flickr™ (photographs, etc.), Youtube™ (video, etc.), and the like.

Content that is uploaded typically has one or more associated descriptive tags. The tags are associated with a particular content object (e.g., photograph, etc.) to facilitate subsequent searching for the object. Thus, in a case where a particular user uploads large number of pictures, the online content repository needs some mechanism that allows other users to subsequently search through the pictures to find particular ones of interest. The tags facilitate this searching process. Generally, the more descriptive the tag, the more searchable and usable the overall content collection.

Continuing the photograph example, particularly interesting photographs benefit from having a number of descriptive and coherent tags. For example, in a "sunset" album containing a large collection of photographs of different sunset landscapes, a photograph showing a tornado at sunset is potentially interesting to a very large number of users. If such a photograph is tagged as being "sunset" and is also tagged with "extreme weather", "tornado", and "storm chaser", the photograph can be found by a much larger audience of interested users. If the photograph is simply tagged as "sunset", the potential audience is much smaller since many users would never think to browse sunset photographs to discover images of a tornado.

Currently, the person uploading the content is responsible for appropriately tagging the content. This results in a wide variation in the quality of the tagging. Some users may not include any tags at all. Many users may only include a single tag, which can be overly simplistic. Tags themselves can be misleading. No coherent methodology for tagging content is presented to the user.

Furthermore, adding content to a web based content repository is typically a cumbersome process that requires copying the content from the web page into another format. For example, users typically must convert a Word™ document or Acrobat™ document into a preferred format of the repository prior to uploading. Furthermore, the uploading to the content repository usually involves visiting a website and using the particular tools provided by that web site. As described above, the person uploading the content is responsible for tagging content. The availability of an appropriate taxonomy, the selection of a relevant position in a taxonomy hierarchy, and any useful keywords for the tagging exist only to the extent of the motivation of the user.

Thus, those cases where a content repository does not have appropriate tags leads to the fact that the content is less discoverable. The content, even though it may be exceptionally compelling, may not be found and utilized by other potentially interested users. This may be contrary to the entire point of certain online content repositories. For example, the whole point of many blogs is to be discoverable.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a server-based method for guided content metadata tagging for an Internet based online repository is implemented. The method includes receiving a user request to upload a content object to a repository. For example, the user accesses the online repository (e.g., via a Web browser interface) and selects a link for uploading the content object (e.g., photograph, document, etc.). This selection is recognized as a user request to upload the object. In response to the request, the method provides a prompt for an initial metadata tag for the object. In one embodiment, the prompt corresponds to the prompting of the user to select an initial taxonomy category in which to classify the object (e.g., is the content object a photograph, document, video file, or the like, or is the content object education related, hobby related, or the like).

In response to the user providing the initial metadata tag, this initial tag is stored and is associated with the content object. A metadata tag knowledgebase is then accessed by indexing the knowledgebase in accordance with the supplied initial tag. One or more suggested metadata tags are retrieved from the knowledgebase and are provided to the user. Upon receiving a confirmation (e.g., the user mouses over and clicks "accept", or the like), the suggested metadata tag is also associated with the object. The metadata tag knowledgebase is then updated to reflect the one or more newly associated tags.

In one embodiment, a plurality of different suggested metadata tags are provided to the user via a hierarchical tree and branch depiction of a graphical user interface. The different suggested metadata tags can each have a different weight, and this weight can be visually depicted (e.g., different font, different character point size, different color, etc.). The differing weights can be determined based on a number of different parameters, such as, for example, a given tag's frequency of use, the total aggregate number of times a given tag has been encountered, the number of times a given tag has been associated with a selected taxonomy category, and the like. The GUI depiction intelligently guides the user to select one or more of the multiple different suggested tags.

In this manner, an online content repository can have a coherent and rich body of tags for its content objects. The intelligent guidance gives a semblance of order to the tagging process and assists the user in determining appropriate tags for given content objects. The quality of the tagging guidance thus increases with use as the history of the user selected tags builds up. These attributes increase the overall discoverability of the objects of the content repository.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

Reference will now be made in detail to embodiments of the claimed subject matter, examples of which are illustrated in the accompanying drawings. While the embodiments will be described, it will be understood that the description are not intended to limit the claimed subject matter to these embodiments. On the contrary, the claimed subject matter is intended to cover alternatives, modifications and equivalents, which may be included within the spirit and scope as defined by the appended claims. Furthermore, in the following detailed description, numerous specific details are set forth in order to provide a thorough understanding of the embodiments. However, it will be recognized by one of ordinary skill in the art that the embodiments may be practiced without these specific details. In other instances, well-known methods, procedures, components, and circuits have not been described in detail as not to unnecessarily obscure aspects of the embodiments.

Some portions of the detailed descriptions are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "guiding" or "aggregating" or "indexing" or the like, refer to the action and processes of a computer system (e.g., computer system 500 of FIG. 5), or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
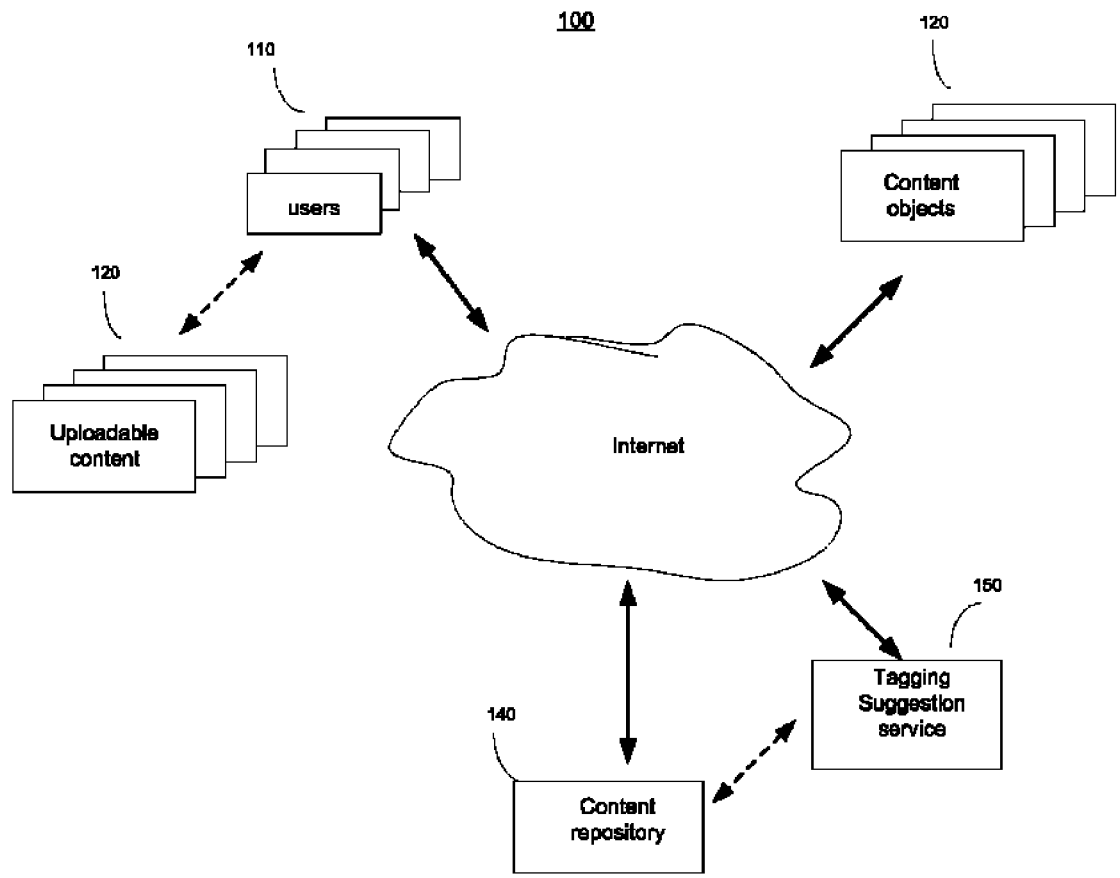
FIG. 1 shows an overview diagram of an exemplary operational setting for providing guided content metadata tagging in accordance with one embodiment.

FIG. 1 shows an overview diagram of an exemplary operational setting 100 for providing guided content metadata tagging in accordance with one embodiment. As depicted in FIG. 1, system 100 illustrates the relationships and the communications that are implemented between users 110, user accessible uploadable content 120, Internet resident content 120, online content repository 140, and tagging suggestion service 150, each coupled to communicate via the Internet.

In one embodiment, the guided content metadata tagging suggestion service 150 is implemented as a server-based method. The tagging suggestion service 150 is implemented as certain software-based functionality that is hosted by a server computer system connected to the Internet. Depending upon the architecture of the service provider, the tagging suggestion service 150 and the content repository 140 can be hosted on the same server computer system. Alternatively, the tagging suggestion service 150 and the content repository 140 can be hosted on separate server computer systems and can be configured to interact with one another (e.g., via the Internet) to cooperatively service user requests.

In a typical operating scenario, a user (e.g., one of the users 110) accesses the web page of the content repository 140 (e.g., via a Web browser). The web page typically has one or more links or URLs that provide instructions or user interface elements that enable the user to upload content. For example, the user accesses the "upload content" page of the content repository 140 and selects a link or button for uploading a content object (e.g., photograph, document, etc.). This selection is recognized as a user request to upload the object. The user can choose to upload locally accessible content (e.g., content stored on a local hard drive, etc.), shown in FIG. 1 as the uploadable content 120, or the user can choose to upload one or more Internet accessible content objects 120 (e.g., content stored on different web sites of the Internet). In response to the request, the tagging suggestion service 150 provides a prompt for an initial metadata tag for the object. For example, the user's Web browser interface would show a prompt dialog "please enter a descriptive tag regarding your upload" or the like. The user would then enter an appropriate descriptive initial metadata tag.

In response to the user providing the initial metadata tag, this initial tag is stored and is associated with the content object. A metadata tag knowledgebase (e.g., coupled to the tagging suggestion service 150) is then accessed by indexing the knowledgebase in accordance with the supplied initial tag. One or more suggested metadata tags are retrieved from the knowledgebase and are provided by the tagging suggestion service 150 to the user 110. Upon receiving a confirmation (e.g., the user mouses over and clicks "accept", or the like), the suggested metadata tag is also associated with the content object. The metadata tag knowledgebase is then updated to reflect the one or more newly associated tags and the object is stored within the content repository 140 and made available for subsequent searches and access.

It should be noted that content objects can exist in a wide variety of forms. For example, content objects can be image files (e.g., JPEG photographs, bitmaps, etc.), video files (e.g., MPEG video, QuickTime video, etc.), RSS feeds, documents, web pages, URLs, or the like.

Figure 2:
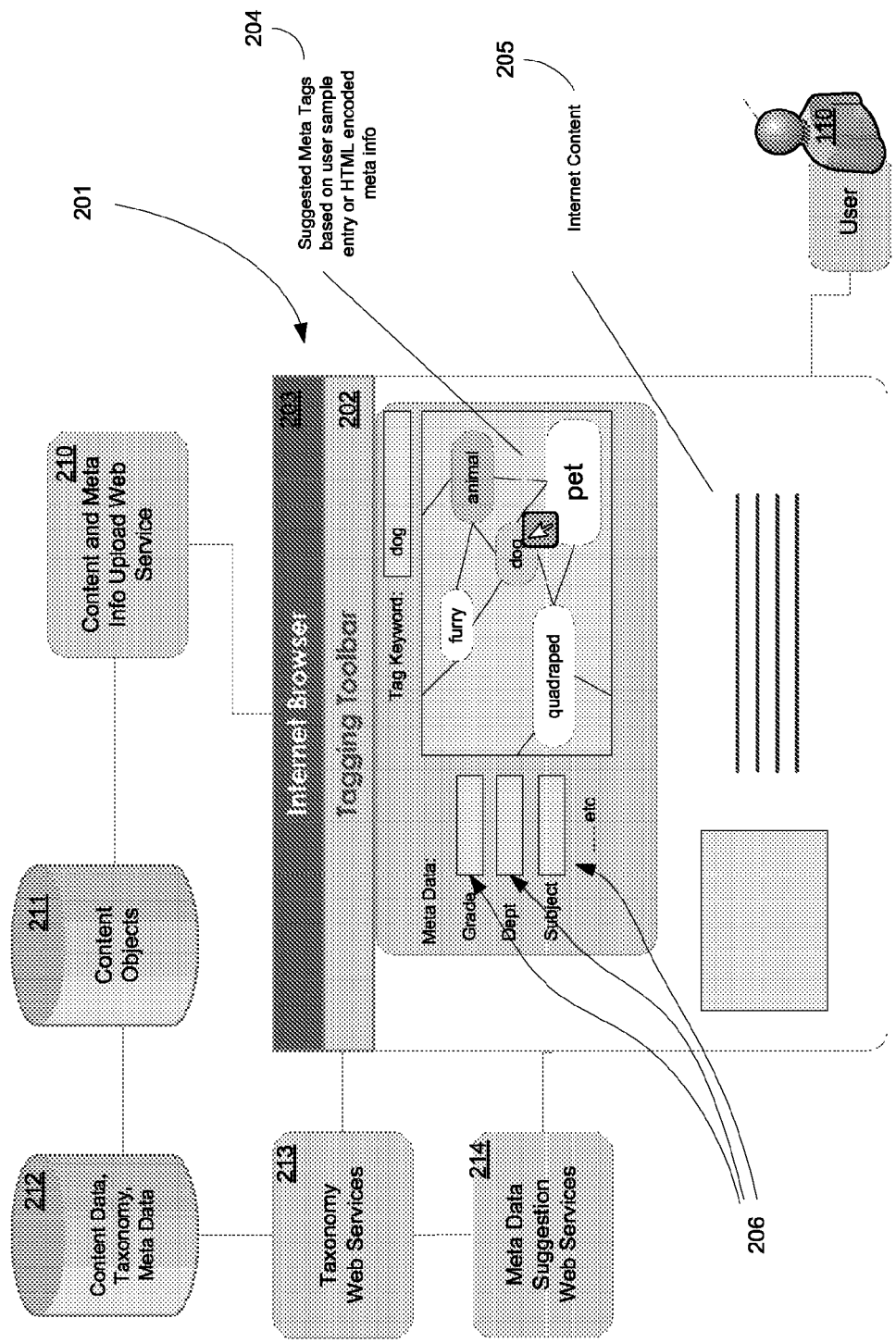
FIG. 2 shows a flow diagram of a typical operating scenario of the guided content metadata tagging suggestion service.

FIG. 2 shows a flow diagram of a typical operating scenario of the guided content metadata tagging suggestion service 150. As depicted in FIG. 2, the user 110 is illustrated interacting with a graphical user interface depiction of a web page 201.

In a typical operating scenario, the user 110 accesses a web page of the content repository 140 and navigates to the appropriate page for uploading content objects. In the FIG. 2 embodiment, the user's Web browser includes a tagging toolbar 202 that comprises a Web browser helper object configured to interact with the tagging suggestion service 150 and the content repository 140. The tagging tool bar 202 facilitates the guided metadata tagging.

In response to the user indicating via the web page that she wishes to upload a content object, the tagging suggestion service 150 and/or the content repository 140 transmits the web page 201 that prompts the user for tagging information. The web page 201 is shown with a tag keyword 203.

This scenario assumes a case where the user is a teacher searching for web-based articles that will be helpful to a class of students studying the domestication of dogs, for example. In the FIG. 2 embodiment, the user is prompted to select an initial taxonomy category in which to classify the content object. For example, in the FIG. 2 depiction, the user has selected the initial taxonomy of a web-based document, and has entered the tag "dog" as an initial tag. FIG. 2 also shows the web-based document 205 itself at the bottom of the web page 201.

The initial taxonomy selection is processed by a taxonomy Web services component 213 and the initial tag "dog" is processed by a metadata suggestion Web services component 214. Both of these components can be implemented as parts of the tagging suggestion service 150 shown in FIG. 1. It should be noted that the use of, and the implementation of, taxonomy categories is optional. Depending upon the requirements of a given application, taxonomy categories and structures can be omitted. In such an application, the initial metadata tag provided by the user supplies the context for deriving additional suggested tags.

Based upon the selection of the initial taxonomy and the entry of the initial tag, the metadata suggestion Web services component 214 can obtain the additional suggested tags. These additional suggested tags (e.g., "furry", "animal", "pet", "quadruped", etc.) are shown within a suggested tags area 204, along with the initial tag "dog".

The user then interacts with the web page 201 and the suggested tags within the area 204 to select additional tags that describe the content object. In one embodiment, the metadata suggestion Web services component 214 can continually update the suggested tags area 204 with new tags as the user navigates among related tags. For example, the user can navigate among the suggested tags by scrolling the area 204 to the left or right, and up or down. Similarly, the user can drag around the area 204 via mouse movement. As the area 204 moves around, different tags can be uncovered and their relationship with the previously viewed tags seen. Additionally, new tags will also be updated based upon the prior trend of tag selections. As shown in the FIG. 2 illustration, particularly related tags can be indicated by connected lines.

It should be noted that tags can be presented using a number of different techniques and/or forms, even though such techniques/forms may not be explicitly depicted by the FIG. 2 illustration. For example, tags can be presented as a list of choices (e.g., a simple list, drop-down list, etc.), or as an XML feed for incorporation into a third-party program.

In one embodiment, the plurality of different suggested metadata tags within the area 204 are shown to the user via a hierarchical "tree and branch" depiction of the graphical user interface. For example, the tree and branch connections between "furry", "animal", and "dog" is illustrated by their relative positions within the area 204 and the lines connecting them.

The different suggested metadata tags can each have a different weight, and this weight can be visually depicted (e.g., different font, different character point size, different color, etc.). The differing weights can be determined based on a number of different parameters, such as, for example, a given tag's frequency of use, the total aggregate number of times a given tag has been encountered, the number of times a given tag has been associated with a selected taxonomy category, and the like. The GUI depiction within the area 204 intelligently guides the user to select one or more of the multiple different suggested tags. As new selections are made, the GUI depiction of the area 204 interactively shows the new interrelationships between the tags.

In addition to choosing additional tags by directly selecting them (e.g., mousing over and clicking) within the area 204, the web page 201 also supports accepting an independently provided metadata tag. The term independently provided refers to the fact that the particular metadata tag is not one of the plurality of suggested metadata tags within the area 204. For example, the user could enter additional metadata tags within the text entry fields 206.

Once the user is satisfied with the tags selected for the particular content objects 211, the user can finish the upload via the content and meta info upload Web service component 210. The upload Web service component 210 can be either part of the content repository 140 or the tagging suggestion service 150. Upon upload, the content data, taxonomy, and tag metadata 212 associated with the objects 211 are transmitted to the taxonomy Web services component 213 where they are used to update and improve the suggestions provided by the metadata suggestion Web services component 214. The tags that have been selected by the user are used to update the history information and the relationship information of the previously entered tags and the previously uploaded content. This enables the suggestion Web services component 214 to provide more intelligent, more coherent, and more guided suggestions to subsequent users.

Figure 3:
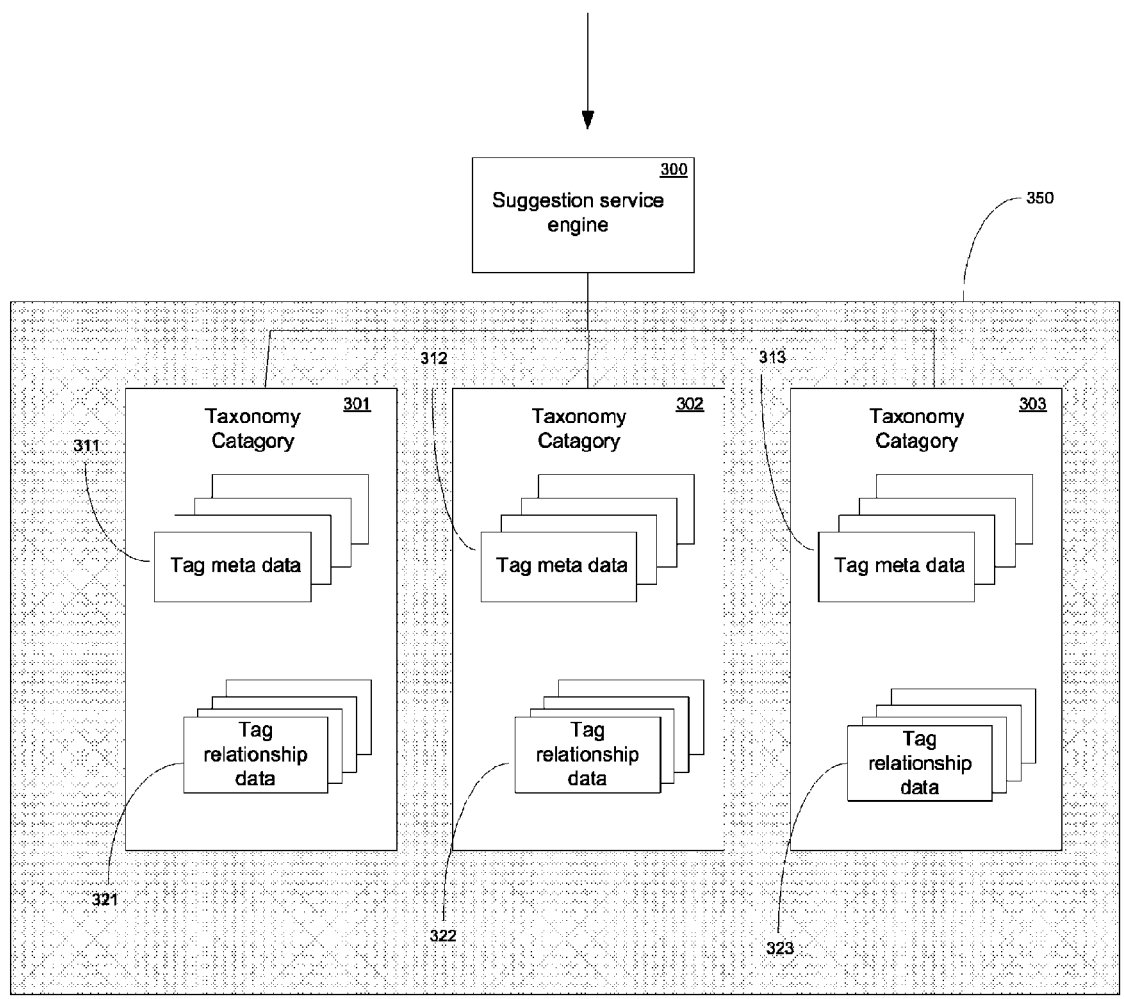
FIG. 3 shows a diagram illustrating a suggestion services engine and a metadata tag knowledgebase in accordance with one embodiment.

FIG. 3 shows a diagram illustrating a suggestion services engine 300 and a metadata tag knowledgebase 350 in accordance with one embodiment. The suggestion services engine 300 comprises the software-based functionality that implements interactions of the tagging suggestion service 150. The metadata tag knowledgebase 350 comprises a stored history of the tags and their associated content objects and relationships there between.

As described above, the quality of the tagging guidance increases with use, as the history of the user select tags builds up. In the FIG. 3 embodiment, the suggestion service engine 300 stores user supplied tag information as tag metadata 311-313 within a plurality of different taxonomy categories 301-303. It should be noted that although the taxonomy categories 301-303 are shown, a much larger number of taxonomy categories can be stored within the metadata tag knowledgebase 350. In one embodiment, one of the taxonomy categories can be considered the default category if a taxonomy category is not specified when a call is made to the service. The interrelationship information between the plurality of different tags and the plurality of different taxonomy categories is captured by the tag relationship data 321-323. Thus, to obtain suggested metadata tags, the suggestion service engine 300 utilizes the information it possesses (e.g., the initial tag, and perhaps an initial taxonomy category) to index the knowledgebase 350 and obtain additional suggested tags. For example, using the initial tag, the suggestion service engine 300 can search the tag relationship data 321-323 for indications as to the most relevant suggestions and the respective weights of these suggestions.

The differing weights computed by the suggestion service engine 300 can be determined based on a number of different parameters. These parameters can include, for example, the frequency of use of a given tag or the frequency with which a given tag is associated with other neighboring tags. Another parameter can be, for example, the total aggregate number of times a given tag has been encountered, or the number of times a given tag has been associated with a selected taxonomy category. Another parameter can be the number of unique users that have identified a given tag, or whether a given tag has been seeded to increase an initial population of tags (e.g., tags programmed in to populate the knowledgebase early in its history).

Figure 4:
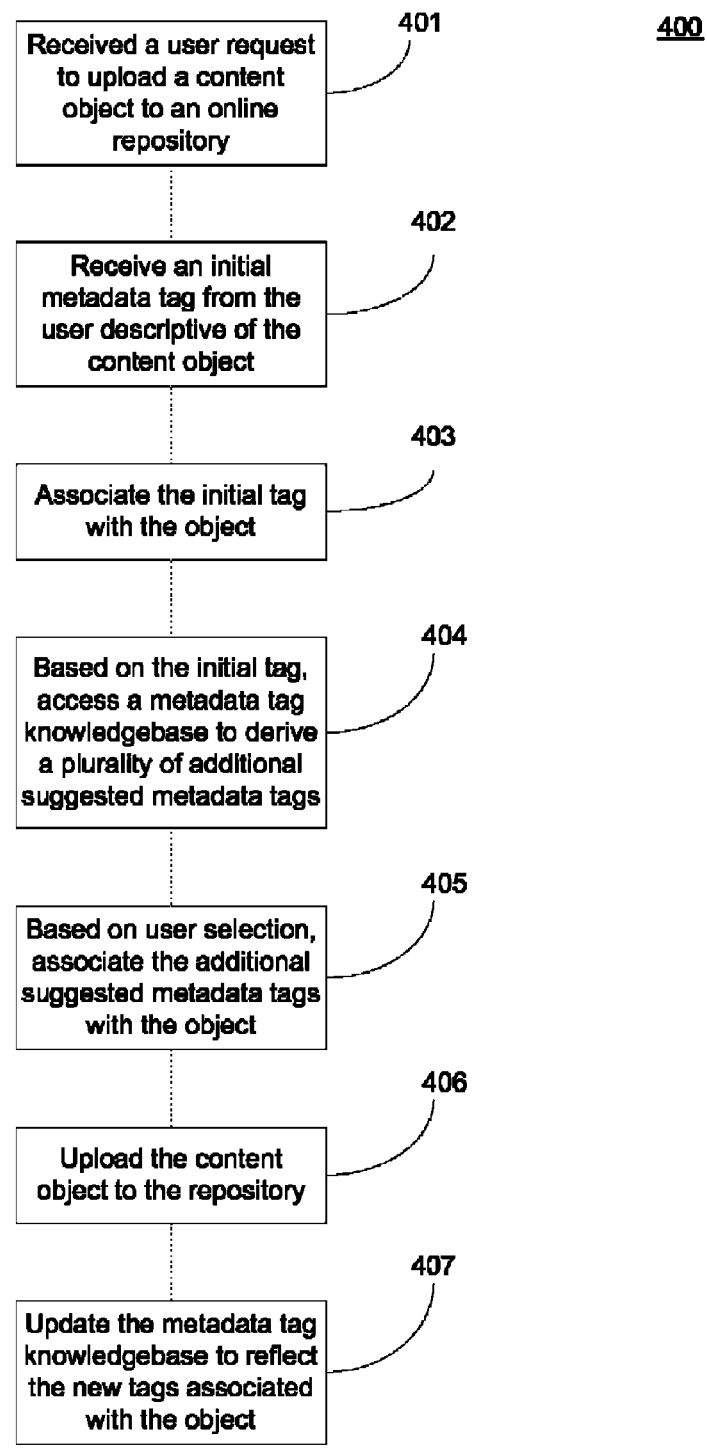
FIG. 4 shows a flowchart of the steps of a guided content metadata tagging process in accordance with one embodiment.

FIG. 4 shows a flowchart of the steps of a process 400 in accordance with one embodiment. As depicted in FIG. 4, process 400 shows the operating steps of a guided content metadata tagging suggestion service as implemented by, for example, the content repository 140 and the tagging suggestion service 150.

Process 400 begins in step 401, where the content repository 140 receives a request from a user to upload a content object to the online repository. The content object may be as simple as a reference to content somewhere on the internet, such as the URL of a page or the URL of an image. Also this first step can be considered optional as the user may just tag a resource already added to the repository, even one added previously by another user. As described above, the online repository typically hosts a web site which lists information and provides access to various types of content stored therein. In a typical usage scenario, at least one of these web pages provides instructions to the user and/or user interface elements facilitating a content uploading process. Additionally, the web site can include functionality that interacts with a browser helper object of the user's client machine (e.g., tagging toolbar 202), makes a call via AJAX directly from the browser web page, or the like.

In step 402, the tagging suggestion service 150 receives an initial metadata tag from the user that describes the content object. As described above, the initial metadata tag from the user can be based purely upon the users discretion or imagination, or upon a prompted taxonomy category (e.g., from taxonomy Web services 213), or the like.

In step 403, the initial tag supplied by the user is associated with the content object. In step 404, based upon the initial tag, the tagging suggestion service 150 accesses a metadata tag knowledgebase 350 to derive a plurality of additional suggested metadata tags. As described above, these additional metadata tags can be visually depicted to the user via elements of a GUI. The GUI depiction can be crafted to indicate relative weight and interrelationship information between the plurality of additional tags (e.g., through different font size, different line widths, different tree branch into relationships, as bars on a graph, as a numerical representation associated to the tag, by color and the like).

In step 405, based upon the user selection, additional suggested metadata tags are associated with the content object. Subsequently, in step 406, the content object and its associated metadata tags are uploaded to the online repository (e.g., if the content object has not been previously uploaded).

In step 407, the associated metadata tags that have been selected by the user are used to update the metadata tag knowledgebase 350 to reflect the new association information, weighting information, frequency information, and the like. Collectively, this new information is generally referred to as the tag relationship data (e.g., tag relationship data 321-323). The updated tag relationship data enhances the quality of the tag suggestions provided to subsequent users. The updated tag relationship data, in conjunction with the intelligence of the suggestion service engine that derives the suggestions, provides a more coherent hierarchy and structure for the overall content tagging process. This attribute enhances the overall value of the content repository by making its content more readily discoverable and usable.

In this manner, an online content repository can have a coherent and rich body of tags for its content objects. The intelligent guidance gives a semblance of order to the tagging process and assists the user in determining appropriate tags for given content objects. The quality of the tagging guidance thus increases with use, as the history of the user selected tags builds up and the frequency of use is recorded. These attributes increase the overall discoverability of the objects of the content repository.

Figure 5:
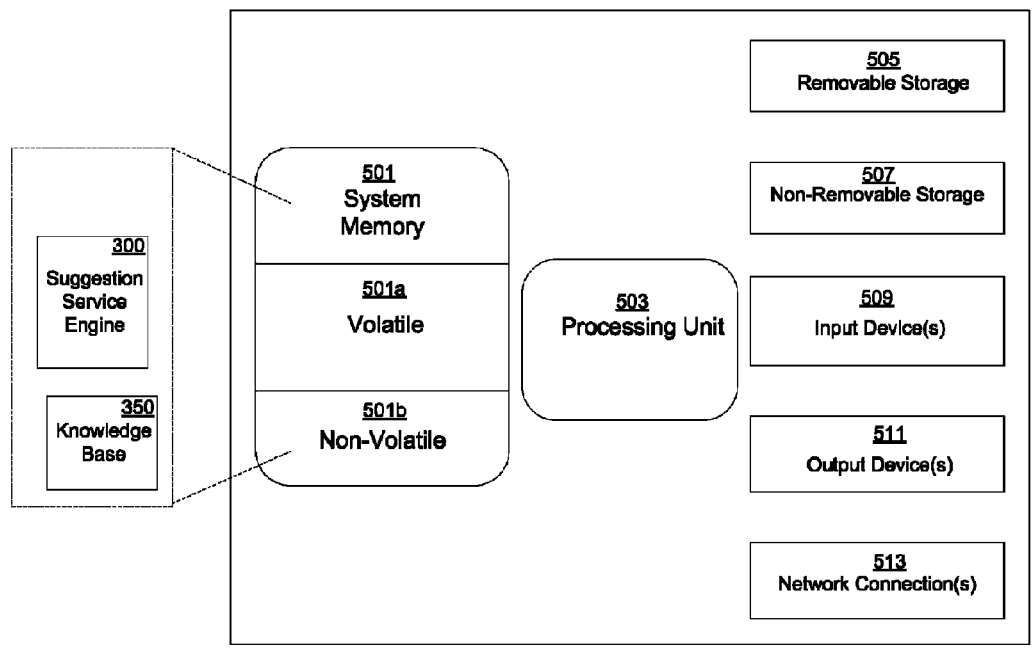
FIG. 5 shows an exemplary computer system according to one embodiment.

FIG. 5 shows an exemplary computer system 500 according to one embodiment. Computer system 500 depicts the components of a basic computer system providing the execution environment for certain hardware-based and software-based functionality for the above described embodiments. For example, computer system 500 can be a system upon which the suggestion service engine 300 and/or the metadata tag knowledgebase 350 from FIG. 3 are instantiated. Computer system 500 can be implemented as, for example, a desktop computer system, laptop computer system or server computer system. Similarly, computer system 500 can be implemented as a handheld device. Computer system 500 typically includes at least some form of computer readable media. Computer readable media can be a number of different types of available media that can be accessed by computer system 500 and can include, but is not limited to, computer storage media.

In its most basic configuration, computer system 500 typically includes processing unit 503 and memory 501. Depending on the exact configuration and type of computer system 500 that is used, memory 501 can be volatile (e.g., such as DRAM, etc.) 501a, non-volatile 501b (e.g., such as ROM, flash memory, etc.) or some combination of the two.

Additionally, computer system 500 can include mass storage systems (e.g., removable 505 and/or non-removable 507) such as magnetic or optical disks or tape. Similarly, computer system 500 can include input devices 509 and/or output devices 511 (e.g., such as a display). Computer system 500 can further include network connections 513 to other devices, computers, networks, servers, etc. using either wired or wireless media. As all of these devices are well known in the art, they need not be discussed in detail.

The foregoing descriptions of the embodiments have been presented for purposes of illustration and description. They are not intended to be exhaustive or to limit the claimed subject matter to the precise forms disclosed, and many modifications and variations are possible in light of the above teaching. The embodiments were chosen and described in order to best explain the principles and practical applications of the embodiments, to thereby enable others skilled in the art to best utilize the invention and various embodiments with various modifications as are suited to the particular use contemplated. It is intended that the scope of the claimed subject matter be defined by the claims appended hereto and their equivalents.

What is claimed is:

1. A computer-implemented method for tagging content, comprising:

providing a graphical user interface (GUI) configured to receive input;

providing, via the GUI, a prompt for an initial taxonomy category from among a plurality of taxonomy categories and a prompt for an initial metadata tag for the object;

receiving, via the GUI, a selection of the initial taxonomy category from among the plurality of taxonomy categories, and associating the object with the initial taxonomy category;

receiving, via the GUI, a selection of the initial metadata tag and associating the initial metadata tag with the object;

based on the initial taxonomy category and the initial metadata tag, accessing a metadata tag knowledgebase to derive a plurality of suggested metadata tags;

visually depicting, via the GUI, the plurality of suggested metadata tags, the visually depicting comprising continually updating a suggested tags area of the GUI with new metadata tags based on a prior trend of tag selections;

receiving, via the GUI, a selected metadata tag from among the plurality of suggested metadata tags, and associating the selected metadata tag with the object; and updating the metadata tag knowledgebase to reflect tags associated with the object.

2. The computer-implemented method of claim 1, wherein the metadata tag knowledgebase is configured to incorporate a weighted history of a plurality of previously submitted tags for a corresponding plurality of previously submitted content objects, and wherein the weighted history is used in deriving the plurality of suggested metadata tags.

3. The computer-implemented method of claim 2, wherein the plurality of suggested metadata tags are depicted in a tree branch hierarchy, where each branch can visually indicate a different weight with respect to the hierarchy.

4. The computer-implemented method of claim 2, further comprising:

accepting a user provided metadata tag via a text entry field.

5. The computer-implemented method of claim 1, wherein the object is a document, an image file, a video file, or a URL.

6. The computer-implemented method of claim 1, further comprising uploading the object to an Internet based online repository.

7. A computer-implemented method for guided content metadata tagging service for an Internet based online repository, comprising:

providing a graphical user interface (GUI) configured to receive input;

receiving a user request to upload an object to a repository;

in response to the request, providing, via the GUI, a prompt for an initial taxonomy category from among a plurality of taxonomy categories and a prompt for an initial metadata tag for the object;

receiving, via the GUI, a selection of the initial taxonomy category from among the plurality of taxonomy categories, and associating the object with the initial taxonomy category;

receiving, via the GUI, a selection of the initial metadata tag;

storing the initial metadata tag and associating the initial metadata tag with the object;

accessing a metadata tag knowledgebase by indexing in accordance with the initial taxonomy category and the initial metadata tag to derive a plurality of suggested metadata tags;

visually depicting, via the GUI, the plurality of suggested metadata tags, the visually depicting comprising continually updating a suggested tags area of the GUI with new metadata tags based on a prior trend of tag selections;

receiving, via the GUI, a selected metadata tag from among the plurality of suggested metadata tags;

associating the selected metadata tag with the object upon receiving a confirmation via the GUI;

storing the object in the repository; and updating the metadata tag knowledgebase to reflect tags associated with the object.

8. The computer-implemented method of claim 7, wherein the metadata tag knowledgebase is configured to incorporate a weighted history of a plurality of previously submitted tags for a corresponding plurality of previously submitted content objects, and wherein the weighted history is used in deriving the plurality of suggested metadata tags.

9. The computer-implemented method of claim 8, wherein the plurality of suggested metadata tags are depicted in a tree branch hierarchy, where each branch can visually indicate a different weight with respect to the hierarchy.

10. The computer-implemented method of claim 8, further comprising:

accepting an independently provided metadata tag, wherein the independently provided metadata tag is not one of the plurality of suggested metadata tags.

11. The computer-implemented method of claim 7, wherein the GUI is implemented as a toolbar of a Web browser interface.

12. The computer-implemented method of claim 7, wherein the GUI is implemented as a web page.

13. The computer-implemented method of claim 7, wherein the GUI is implemented as an application executing on a user client computer system.

14. A computer readable media having computer executable components for implementing a guided content metadata tagging service, comprising:

a suggestion service engine; and a metadata tag knowledgebase coupled to the suggestion service engine, wherein the suggestion service engine is operable to:

interact with a graphical user interface (GUI) configured to receive input;

provide, via the GUI, a prompt for an initial taxonomy category from among a plurality of taxonomy categories and a prompt for an initial metadata tag for an object in response to receiving a user request to upload the object;

receive, via the GUI, a selection of the initial taxonomy category from among the plurality of taxonomy categories, and associate the object with the initial taxonomy category;

receive, via the GUI, a selection of the initial metadata tag and associate the initial metadata tag with the object;

search a metadata tag knowledgebase by indexing the knowledgebase with the initial taxonomy category and the initial metadata tag to derive a plurality of suggested metadata tags;

visually depict, via the GUI, the plurality of suggested metadata tags, the visually depicting comprising continually updating a suggested tags area of the GUI with new metadata tags based on a prior trend of tag selections;

receive, via the GUI, a selected metadata tag from among the plurality of suggested metadata tags;

associate the selected metadata tag with the object upon receiving a confirmation via the GUI;

store the object in the repository; and update the metadata tag knowledgebase to reflect tags associated with the object.

15. The computer readable media of claim 14, wherein the suggestion service engine and the metadata knowledgebase are hosted by a server coupled to the Internet.

16. The computer readable media of claim 14, wherein the GUI is a Web browser based GUI and the plurality of suggested metadata tags are depicted in a tree branch hierarchy, where each branch can visually indicate a different weight with respect to the hierarchy.

17. The computer readable media of claim 14, wherein the metadata tag knowledgebase is configured to incorporate a weighted history of a plurality of previously submitted tags for a corresponding plurality of previously submitted content objects, and wherein the weighted history is used in deriving the plurality of suggested metadata tags.

* * * * *